United States Patent Office 3,166,593
Patented Jan. 19, 1965

3,166,593
PROCESS FOR PREPARING TETRACHLORO-DI-NITROBENZENE AND TETRACHLORO-PHENYL-ENE DIAMINE
John Frederick Harris, Meldreth, near Royston, and David William John Lane, Barton, England, assignors to Fisons Pest Control Limited, Harston, Cambridgeshire, England
No Drawing. Filed Nov. 4, 1963, Ser. No. 321,347
Claims priority, application Great Britain, Nov. 10, 1962, 42,553/62
15 Claims. (Cl. 260—580)

The present invention relates to a process for the preparation of 1,2,3,4-tetrachloro-5-nitrobenzene, the nitration of this and the reduction of the formed 1,2,3,4-tetrachloro-5,6-dinitrobenzene to tetrachloro-o-phenylene diamine.

It has now surprisingly been found that 1,2,4-trichloro-5-nitrobenzene can be chlorinated in high yield to 1,2,3,4-tetrachloro-5-nitrobenzene, and that the 1,2,3,4-tetrachloro-5-nitrobenzene so formed may be nitrated to 1,2,3,4-tetrachloro-5,6-dinitrobenzene in high yield from which 1,2,3,4-tetrachloro-o-phenylene diamine may be readily obtained by reduction.

Tetrachloro-o-phenylene diamine is a fungicide. Tetrachloro-o-phenylene diamine may also be an intermediate in the manufacture of other useful compounds; for example this may be converted readily to tetrachlorobenzotriazole, which is also a fungicide.

The present invention is for a process for the preparation of 1,2,3,4-tetrachloro-5-nitrobenzene by the chlorination of 1,2,4-trichloro-5-nitrobenzene with chlorine in the presence of chlorosulphonic acid, and in the presence of a catalytic amount of iodine.

The present invention is also for a process for the preparation of 1,2,3,4-tetrachloro-5-nitrobenzene as described above characterised in that the 1,2,4-trichloro-5-nitrobenzene is prepared by the nitration of 1,2,4-trichlorobenzene.

The present invention is also for a process for the preparation of 1,2,3,4 - tetrachloro - 5,6 - dinitrobenzene which comprises nitrating 1,2,3,4-tetrachloro-5-nitrobenzene prepared as described above by treatment with concentrated nitric and sulphuric acids at elevated temperature.

The present invention is also for a process for the preparation of tetrachloro-o-phenylene diamine which comprises reducing 1,2,3,4-tetrachloro-5,6-dinitrobenzene prepared as described above.

The chlorination of 1,2,4-trichloro-5-nitrobenzene is carried out using chlorine; suitably chlorine is bubbled through the reaction medium containing 1,2,4-trichloro-5-nitrobenzene. However other methods of contacting the 1,2,4-trichloro-5-nitrobenzene may be used if desired, such as passing chlorine over a film of medium containing the 1,2,4-trichloro-5-nitrobenzene.

Where the chlorination is carried out by passing chlorine through the reaction medium, it is desirable for the reaction medium to be agitated vigorously, for example by use of a mechanical stirrer. The 1,2,4-trichloro-5-nitrobenzene is preferably chlorinated without dilution or dispersion, however if desired the chlorination may be carried out in the presence of an inert solvent.

The chlorination is carried out in the presence of chlorosulphonic acid and iodine. The chlorosulphonic acid may be present in amount comprising 0.2–4.0 mols, and preferably 1–2 mols, per mol of the 1,2,4-trichloro-5-nitrobenzene. The iodine may be present in amount comprising 0.15–2% by weight, and preferably 0.5–1% by weight of the 1,2,4-trichloro-5-nitrobenzene. This chlorination is suitably carried out at a temperature in the range 30–150° C., and preferably at a temperature in the range 40–75° C.

This chlorination can be carried out with an efficiency of at least 95%.

The mono-nitration of 1,2,4-trichlorobenzene may be carried out with nitric acid or with a mixture of nitric acid and sulphuric acid. This mono-nitration is preferably carried out with nitric acid alone, in which case the nitric acid is of a concentration in the range 95–100% by weight; it is preferred to use the upper concentrations in this range. The nitric acid should be used in excess over the stoichiometric equivalent and is suitably used in amount comprising 1.5–30 mols, and preferably 5–10 mols, per mol of 1,2,4-trichlorobenzene. The mono-nitration is carried out at an elevated temperature, for example in the range 40–90° C., and preferably at 50–70° C.

Where the mono-nitration is carried out using a mixture of nitric acid and sulphuric acid, the nitric acid may be of a concentration in the range 70–100%, and preferably 90–100% by weight, and the sulphuric acid may be of a concentration in the range 90–100%, and preferably 93.5–100% by weight. The nitric acid should be used in excess over the stoichiometric equivalent and may be used in amount comprising 1.25–5 mols per mol of 1,2,4-trichlorobenzene, the sulphuric acid being present in amount comprising at least the molecular equivalent of the nitric acid and desirably comprising 5–10 mols per mol of 1,2,4-trichlorobenzene. In this case the mono-nitration is carried out at an elevated temperature, for example in the range 40–70° C., and preferably 60–70° C. This mono-nitration can be carried out with an efficiency of at least 90%.

In the nitration of 1,2,3,4-tetrachloro-5-nitrobenzene to 1,2,3,4-tetrachloro-5,6-dinitrobenzene using mixed nitric and sulphuric acids, the nitric acid may be of a concentration in the range 80–100%, preferably 95–100% by weight and the sulphuric acid may be of a concentration in the range 90–100%, preferably 93.5–100% by weight. It is preferred to use the most concentrated acids, as in this case the nitration proceeds most rapidly. Where one acid is used in a concentration at the lower limit indicated, the other acid should desirably be of a concentration towards the upper limit indicated. The nitric acid requires to be used in considerable excess, comprising at least a 5-fold excess, over the stoichiometric equivalent, and suitably 15–30 moles of nitric acid are used per mol of 1,2,3,4-tetrachloro-5-nitrobenzene. The sulphuric acid also should be present in amount comprising at least the molecular equivalent of the nitric acid. Desirably the sulphuric acid is present in excess comprising 1.2–5 mols and preferably about 1.5 mols of sulphuric acid per mol of nitric acid.

The nitration should be carried out at an elevated temperature, desirably in the range 50–115° C. It is preferred to carry out the nitration under reflux, which is at a temperature of about 105–108° C. The time required for the reaction is dependent on the reaction temperature, being shorter at the higher temperatures and longer at the lower temperatures.

This nitration can be carried out with an efficiency of 85%.

The reduction of the 1,2,3,4-tetrachloro-5,6-dinitrobenzene may be carried out in any conventional way, preferably under acidic or neutral conditions. Thus for example the 1,2,3,4-tetrachloro-5,6-dinitrobenzene may be reduced using stannous chloride and hydrochloric acid, stannous chloride and alcohol such as ethyl-alcohol or isopropyl-alcohol, sodium hydrosulphite or zinc and an acid such as acetic acid or hydrochloric acid. The reduction is suitably carried out in the presence of a solvent for tetrachloro-o- phenylene diamine such as an alcohol for example ethyl-alcohol or isopropyl-alcohol, dioxan or tetrahydrofuran. This reduction can be carried out with an efficiency of 95%.

The following examples are given to illustrate the present invention. The parts and percentages are by weight unless otherwise indicated.

*Example 1*

10 parts of 1,2,4-trichlorobenzene were added to 76 parts of 95% nitric acid over 2.5 minutes with mechanical agitation. The temperature rose to 50° C. After agitating for a further eight minutes the nitric acid was diluted with a large volume of water. The solid product was filtered, water washed and air-dried. Yield 11.7 parts of 1,2,4-trichloro-5-nitrobenzene (91.5%), melting point 44–50° C.

To 11.7 parts of 1,2,4-trichloro-5-nitrobenzene were added 11.9 parts of chlorosulphonic acid and 0.1 part of iodine. Chlorine was added at 70–80° C. over 1¼ hours to a gain of 1.8 parts. The product was isolated by dilution with water and recrystallised from methanol. Yield 13 parts of 1,2,3,4-tetrachloro-5-nitrobenzene (96%), melting point 56–58° C.

13 parts of the 1,2,3,4-tetrachloro-5-nitrobenzene were refluxed for two hours with a mixture of 98 parts of 98% sulphuric acid and 98 parts of 95% nitric acid. The product 1,2,3,4-tetrachloro-5,6-dinitrobenzene was isolated by dilution with water, filtered and washed. Yield 12 parts (80%), melting point 144–146° C. (Pure 151–153° C.).

1.6 parts of the 1,2,3,4-tetrachloro-5,6-dinitrobenzene were added slowly to a refluxing solution of 9.7 parts of stannous chloride, 7.85 parts of isopropyl alcohol and 12.5 parts of hydrochloric acid, the reflux being maintained by the addition of the dinitro compound. When addition was complete, the mixture was refluxed for a further 15 minutes, diluted with water and allowed to cool. The precipitated white solid 1,2,3,4-tetrachloro-o-phenylene diamine was filtered off, washed well with water and dried. The product had a melting point 232° C. (with decomposition). Yield 95%.

The overall yield of tetrachloro-o-phenylene diamine was 67%.

The reduction of the 1,2,3,4-tetrachloro-5,6-dinitrobenzene was also carried out using sodium hydrosulphite (dithionite) in aqueous ethyl alcohol.

*Example 2*

The process of Example 1 was repeated, but where 1.2 parts of 1,2,3,4-tetrachloro-5-nitrobenzene were refluxed for two hours with a mixture of 5.5 parts of 95% nitric acid and 11.7 parts of 98% sulphuric acid. The product 1,2,3,4-tetrachloro-5,6-dinitrobenzene was isolated by dilution with water, filtered and washed. Yield 1.15 parts (81%), melting point 147–149° C. The overall yield of tetrachloro-o-phenylene diamine was again 67%.

*Example 3*

10 parts of 1,2,4-trichlorobenzene were added to 76 parts of 96% nitric acid over 2.5 minutes with mechanical agitation. The temperature rose to 50° C. After agitating for a further eight minutes the nitric acid was diluted with a large volume of water. The solid product was filtered, water washed and air-dried. Yield 11.7 parts of 1,2,4-trichloro-5-nitrobenzene (91.5%), melting point 44–50° C. (literature 58° C.).

To 11.7 parts of 1,2,4-trichloro-5-nitrobenzene were added 11.9 parts by weight of chlorosulphonic acid and 0.1 part of iodine. Chlorine was added at 70–80° C. over 1¼ hours to a gain of 1.8 parts. The product was isolated by dilution with water and recrystallised from methanol. Yield 13 parts of 1,2,3,4-tetrachloro-5-nitrobenzene (96%), melting point 56–58° C.

1.2 parts of 1,2,3,4-tetrachloro-5-nitrobenzene were refluxed for two hours with a mixture of 5.5 parts of 94% nitric acid (d. 1.50) and 11.7 parts of 99% sulphuric acid. The product, 1,2,3,4-tetrachloro-5,6-dinitrobenzene was isolated by dilution with water, filtered and washed. Yield 1.15 parts (81%), melting point 147–149° C.

1.6 parts of the 1,2,3,4-tetrachloro-5,6-dinitrobenzene so obtained were added slowly to a refluxing solution of 9.7 parts of stannous chloride, 6.3 parts of industrial ethyl-alcohol and 12.5 parts of hydrochloric acid, the reflux being maintained by the addition of the dinitro compound. When the addition was complete the mixture was refluxed for a further 15 minutes, diluted with water and allowed to cool. The product, tetrachloro-o-phenylene diamine was filtered off and water washed to yield white crystalline solid. Yield 87.5%, melting point 232° C. (with decomposition).

The overall yield of tetrachloro-o-phenylene diamine in this case was 62%.

*Example 4*

To 100 parts by weight of crude 1,2,4-trichloro-5-nitrobenzene was added 0.15 part of iodine and 200 parts of chlorosulphonic acid. Chlorine was added at 40–60° C. to a gain in weight of 14.5 parts. The product was isolated by pouring the reaction mixture into water. Yield 115 parts of crude 1,2,3,4-tetrachloro-5-nitrobenzene (100%), melting point 49° C.

The formed 1,2,3,4-tetrachloro-5-nitrobenzene was nitrated and then reduced as described in Example 1 to give tetrachloro-o-phenylene diamine.

*Example 5*

To 100 parts by weight of crude 1,2,4-trichloro-5-nitrobenzene was added 1.8 parts of iodine and 11 parts of chlorosulphonic acid. Chlorine was added at 55–60° C. The product was isolated by diluting with a large volume of water. Yield 111 parts of crude 1,2,3,4-tetrachloro-5-nitrobenzene (96%).

The formed 1,2,3,4-tetrachloro-5-nitrobenzene was nitrated and then reduced as described in Example 3 to give tetrachloro-o-phenylene diamine.

We claim:
1. A process for the preparation of 1,2,3,4-tetrachloro-5-nitrobenzene which comprises chlorinating 1,2,4-trichloro-5-nitrobenzene by treatment with chlorine in the presence of 0.2–4.0 mols of chlorosulphonic acid per mol of 1,2,4-trichloro-5-nitrobenzene and 0.15-2% by weight of iodine based on the 1,2,4-trichloro-5-nitrobenzene, at a temperature in the range 30–150° C.

2. A process as claimed in claim 1 wherein the chlorosulphonic acid is present in amount comprising 1–2 mols per mol of 1,2,4-trichloro-5-nitrobenzene and the iodine is present in amount comprising 0.5–1% by weight of the 1,2,4-trichloro-5-nitrobenzene.

3. A process as claimed in claim 1 wherein the chlorination is carried out at a temperature of 40–75° C.

4. A process for the preparation of 1,2,3,4-tetrachloro-5-nitrobenzene which comprises nitrating 1,2,4-trichlorobenzene by treatment with nitric acid of a concentration in the range 95–100% by weight in amount comprising 1.5–30 mols of nitric acid per mol of 1,2,4-trichlorobenzene, at elevated temperature, to form 1,2,4-trichloro-5-nitrobenzene and chlorinating the 1,2,4-trichloro-5-nitrobenzene by treatment with chlorine in the presence of 0.2–4.0 mols of chlorosulphonic acid per mol of 1,2,4-trichloro-5-nitrobenzene and 0.15–2% by weight of iodine based on the 1,2,4-trichloro-5-nitrobenzene, at a temperature in the range 30–150° C.

5. A process as claimed in claim 4 wherein the nitration is carried out at a temperature in the range 40–90° C.

6. A process for the preparation of 1,2,3,4-tetrachloro-5-nitrobenzene which comprises nitrating 1,2,4-trichlorobenzene by treatment with a mixture of nitric acid of a concentration in the range 70–100% by weight and sulphuric acid of a concentration in the range 90–100% by weight, the nitric acid being present in amount in excess of the molecular equivalent to 1,2,4-trichlorobenzene and the sulphuric acid being present in amount in excess of the molecular equivalent to nitric acid, at an elevated temperature, to form 1,2,4-trichloro-5-nitrobenzene and chlorinating the 1,2,4-trichloro-5-nitrobenzene by treatment with chlorine in the presence of 0.2–4.0 mols of chlorosulphonic acid per mol of 1,2,4-trichloro-5-nitrobenzene and 0.15–2% by weight of iodine based on the 1,2,4-trichloro-5-nitrobenzene, at a temperature in the range 30–150° C.

7. A process as claimed in claim 6 wherein in the nitration step the nitric acid is of a concentration in the range 90–100% by weight and the sulphuric acid is of a concentration in the range 93.5–100% by weight, the nitric acid being present in amount comprising 1.25–5 mols per mol of 1,2,4-trichlorobenzene, the sulphuric acid being present in amount comprising 5–10 mols per mol of 1,2,4-trichlorobenzene, the nitration being carried out at a temperature in the range 40–70° C.

8. A process for the preparation of 1,2,3,4-tetrachloro-5,6-dinitrobenzene which comprises nitrating 1,2,4-trichlorobenzene by treatment with nitric acid of a concentration in the range 95–100% by weight in amount comprising 1.5–30 mols of nitric acid per mol of 1,2,4-trichlorobenzene, at elevated temperature, to form 1,2,4-trichloro-5-nitrobenzene and chlorinating the 1,2,4-trichloro-5-nitrobenzene by treatment with chlorine in the presence of 0.2–4.0 mols of chlorosulphonic acid per mol of 1,2,4-trichloro-5-nitrobenzene and 0.15–2% by weight of iodine based on the 1,2,4-trichloro-5-nitrobenzene, at a temperature in the range 30–150° C. and nitrating the formed 1,2,3,4-tetrachloro-5-nitrobenzene by treatment with a mixture of nitric acid of a concentration in the range 80–100% by weight and sulphuric acid of a concentration in the range 90–100% by weight, the nitric acid being used in amount comprising a 5-fold excess over the stoichiometric equivalent, the sulphuric acid being used in amount comprising at least the molecular equivalent of the nitric acid, the nitration being carried out at a temperature in the range 50–115° C.

9. A process for the preparation of 1,2,3,4-tetrachloro-5,6-dinitrobenzene which comprises nitrating 1,2,4-trichlorobenzene by treatment with a mixture of nitric acid of a concentration in the range 70–100% by weight and sulphuric acid of a concentration in the range 90–100% by weight, the nitric acid being present in amount in excess of the molecular equivalent to 1,2,4-trichlorobenzene and the splphuric acid being present in amount in excess of the molecular equivalent to nitric acid, at an elevated temperature, to form 1,2,4-trichloro-5-nitrobenzene and chlorinating the 1,2,4-trichloro-5-nitrobenzene by treatment with chlorine in the presence of 0.2–4.0 mols of chlorosulphonic acid per mol of 1,2,4-trichloro-5-nitrobenzene and 0.15–2% by weight of iodine based on the 1,2,4-trichloro-5-nitrobenzene, at a temperature in the range 30–150° C., and nitrating the formed 1,2,3,4-tetrachloro-5-nitrobenzene by treatment with a mixture of nitric acid of a concentration in the range 80–100% by weight and sulphuric acid of a concentration in the range 90–100% by weight., the nitric acid being used in amount comprising a 5-fold excess over the stoichiometric equivalent, the sulphuric acid being used in amount comprising at least the molecular equivalent of the nitric acid, the nitration being carried out at a temperature in the range 50–115° C.

10. A process for the preparation of tetrachloro-o-phenylenediamine which comprises nitrating 1,2,4-trichlorobenzene by treatment with nitric acid of a concentration in the range 95–100% by weight in amount comprising 1.5–30 mols of nitric acid per mol of 1,2,4-trichlorobenzene, at elevated temperature, to form 1,2,4-trichloro-5-nitrobenzene and chlorinating the 1,2,4-trichloro-5-nitrobenzene by treatment with chlorine in the presence of 0.2–4.0 mols of chlorosulphonic acid per mol of 1,2,4-trichloro-5-nitrobenzene and 0.15–2% by weight of iodine based on the 1,2,4-trichloro-5-nitrobenzene, at a temperature in the range 30–150° C., and reducing the formed 1,2,3,4-tetrachloro-5,6-dinitrobenzene under conditions selected from acid and neutral conditions.

11. A process as claimed in claim 10 wherein the reduction is effected with stannous chloride and hydrochloric acid.

12. A process as claimed in claim 10 wherein the reduction is effected with stannous chloride and an alcohol.

13. A process as claimed in claim 10 wherein the reduction is effected with sodium hydrosulphite.

14. A process as claimed in claim 10 wherein the reduction is effected with zinc and an acid.

15. A process for the preparation of tetrachloro-o-phenylenediamine which comprises nitrating 1,2,4-trichlorobenzene by treatment with a mixture of nitric acid of a concentration in the range 70–100% by weight and sulphuric acid of a concentration in the range 90–100% by weight, the nitric acid being present in amount in excess of the molecular equivalent to 1,2,4-trichlorobenzene and the sulphuric acid being present in amount in excess of the molecular equivalent to nitric acid, at an elevated temperature, to form 1,2,4-trichloro-5-nitrobenzene and chlorinating the 1,2,4-trichloro-5-nitrobenzene by treatment with chlorine in the presence of 0.2–4.0 mols of chlorosulphonic acid per mol of 1,2,4-trichloro-5-nitrobenzene and 0.15–2% by weight of iodine based on the 1,2,4-trichloro-5-nitrobenzene, at a temperature in the range 30–150° C., and nitrating the formed 1,2,3,4-tetrachloro-5-nitrobenzene by treatment with a mixture of nitric acid of a concentration in the range 80–100% by weight and sulphuric acid of a concentration in the range 90–100% by weight, the nitric acid being used in amount comprising a 5-fold excess over the stoichiometric equivalent, the sulphuric acid being used in amount comprising at least the molecular equivalent of the nitric acid, the nitration being carried out at a temperature in the range 50–115° C., and reducing the formed 1,2,3,4-tetrachloro-5,6-dinitrobenzene under conditions selected from acid and neutral conditions.

No references cited.